United States Patent Office 3,488,149
Patented Jan. 6, 1970

3,488,149
SYNTHESIS OF ANATASE TiO₂
Joseph Francis Skrivan, Stamford, Conn., assignor to American Cyanamid Company, Stamford, Conn., a corporation of Maine
No Drawing. Filed Dec. 1, 1965, Ser. No. 510,938
Int. Cl. C01g 23/04
U.S. Cl. 23—202                        4 Claims

ABSTRACT OF THE DISCLOSURE

A process is provided for the preparation of titanium dioxide in the anatase crystalline form. The process comprises converting a volatile titanium compound to titanium dioxide by either oxidative or hydrolytic means in the presence of 0.1 to 10.0% of a boron material based upon the weight of said volatile compound.

---

This invention relates broadly to a process for the preparation of a specific crystalline form of finely divided titanium dioxide. More particularly, it relates to the preparation of a new anatase titanium dioxide composition by high temperature hydrolysis or oxidation of titanium tetrachloride. Moreover, it relates to the new compositions thus prepared.

Titanium dioxide is known to exist in several crystalline forms including the rutile and anatase forms. Each form has its own characteristics and special qualities making it more desirable than the other for certain end uses. For example, the anatase form, because of its bluish-white tint tone and chalking characteristics, is sometimes preferred for outdoor white paints where a self-cleaning protective coating is needed. There are many applications which require use of the more stable non-chalking rutile form.

Various methods of producing titanium dioxide in its various crystalline forms are known at the present time. One method used to produce anatase $TiO_2$ involves the digestion of titaniferous ore material with sulfuric acid to produce titanium sulphate. The sulphate is hydrolyzed to precipitate hydrous $TiO_2$. This may be calcined to give particulate $TiO_2$ of the anatase form. It is often necessary to subject the product to further treatment if it is desired to improve its quality for pigment application.

Another known method of producing titanium dioxide is to react titanium tetrachloride with oxygen at an elevated temperature. In this method, the reactants are brought to reaction temperatures by burning an intimately mixed gas such as carbon monoxide or methane. The byproducts of burning—which may be carbon dioxide or water—are thus present during the tetrachloride-oxygen reaction. From this process, there is obtained a product containing substantial amounts of the rutile form together with the anatase form of $TiO_2$.

Another method for producing $TiO_2$ is a hydrolysis mechanism characterized by the step of contacting vaporous $TiCl_4$ with the combustion product of any hydrogen-containing material. Like other known vapor phase processes, this leads to a product which is a mixture of the anatase and rutile forms, there being no known means to substantially increase the amount of anatase.

Still another known method for preparing $TiO_2$ involves the oxidation of $TiCl_4$ in a plasma stream. In this method a very excellent product is obtained insofar as a particle size distribution is concerned and by use of a rutile promoting substance, a product can be obtained which has an extremely high rutile content and a low anatase content. Without such a rutile promoter the product is a mixture of anatase and rutile forms of $TiO_2$ which is not ideal for uses requiring purity with respect to crystalline content.

In general, it has been the case until the present time that $TiO_2$ of very high rutile content could be obtained from efficient vapor phase procedures with use of proper promoters whereas $TiO_2$ products with very high anatase content (i.e., above 60%), were not directly obtainable by high temperature, vapor phase processes and could only be obtained by the inefficient sulfuric acid digestion process.

In view of the state of the art, it is an object of this invention to provide a means of preparing titanium dioxide in substantially pure anatase form by the vapor phase conversion of a volatile salt of titanium.

It is another object of this invention to provide a new titanium dioxide composition having a high anatase content and a minor amount of boron oxide.

Other objects of the invention will be evident from the following detailed description thereof.

In accordance with this invention, it has been found that these objects can be accomplished in a surprisingly simple and effective manner. The method of this invention merely involves oxidizing or hydrolyzing the vaporous titanium starting material in the presence of a small amount of a volatilized boron compound, or the metal itself. When the hydrolysis or oxidation is thus conducted, the product is obtained essentially in the anatase form of $TiO_2$.

The method of this invention provides the first known means of obtaining anatase $TiO_2$ from a high temperature process. It is most surprising that it works at all, since the presence of other metals (or compounds thereof) of the same periodic classification as boron (i.e., Group III), is known to have the opposite effect. Thus, use of aluminum chloride instead of boron chloride promotes the formation of the rutile form of $TiO_2$.

The present invention thus provides an unobvious way of increasing the anatase content of a $TiO_2$ product over what is heretofore obtainable. It should be noted that in general a vapor phase conversion of titanium-containing material to $TiO_2$ normally leads to a product having substantial amounts (at least about 40–50%) of the rutile crystalline form. By following the present invention, it is possible to increase the amount of the anatase form by any increment, depending upon the amount of the boron material added to the oxidation mixture; and also depending upon the presence of other materials which may perform a useful function while to some extent nullifying the effect of the boron material. For example, if the conversion to $TiO_2$ is conducted in the presence of a boron material and a nucleating agent (e.g., $AlCl_3$), interesting and useful effects can be obtained. The boron material has as its effect, the promotion of anatase formation. The $AlCl_3$ effects a reduction of particle size, but also counteracts the effect of the boron material. Therefore, the product made in the presence of the boron and aluminum materials will have a larger proportion of small particles (which is desirable for many pigment purposes) and a lower anatase content (which can be tolerated in many applications). Such a product would be highly useful in the preparation of chalking outdoor white paints where 10–15% of the rutile form of $TiO_2$ is tolerable.

In other situations, it is very critical to have almost no rutile form in the $TiO_2$ material. For example, in paper manufacture, a large user of anatase $TiO_2$, the presence of rutile $TiO_2$ is extremely undesirable in view of the abrasiveness of this material and its dulling effect on paper-cutting knives. Tolerances of the rutile form of $TiO_2$ in this case are generally less than 2–3% and the remainder must be in the anatase form. To prepare a product of this type in accordance with the present invention, it might be preferred to add only the boron material to the vaporous titanium starting material since some other materials might tend to give an adversely high rutile content in the product.

The present invention thus is not limited to the production of substantially pure anatase $TiO_2$, but rather resides in a new means for increasing anatase content as may be desired for the specific intended end use of the $TiO_2$ product.

For the purpose of the present invention, any form of boron, either elemental or chemically combined, may be added to the titanium starting material. Solid forms of boron can be conveniently used by either vaporizing or comminuting the same before addition to the titanium reactant stream. Among the useful boron compounds are boron trichloride, boron trifluoride (for hydrolysis reactions), boron sulfide, boron hydrides and boron oxide. The amount of boron compound which is to be used depends upon the desired anatase content of product $TiO_2$. In general, it is desirable to use as little as necessary, and for most purposes, 0.1–10% $B_2O_3$ based on the weight of the titanium dioxide is sufficient. Within this range, it will be found that 1–6% of the boron material gives the desired effect with minimal loss of $TiO_2$ tinting strength.

The process of this invention can be adjusted to the framework of any vapor phase conversion of a titanium salt. It can be used with plasma jet processes, flame processes (either laminar or turbulent) or hydrolysis processes in which volatile salts of titanium such as the halides or oxyhalides are feed reactants. In all cases, the principal of operation is the same with respect to the present invention, i.e., a boron compound, or boron itself in a vaporous form, is present in the zone in which $TiO_2$ is being formed. To permit this, the boron material is added to either the titanium starting material, the oxidizing or hydrolyzing reactant, or even to a pre-formed mixture of the two, providing it has not reached reaction temperature at the time of the addition.

The following examples are presented to further illustrate the present invention.

Examples 1–6

In an apparatus of the type described in Example 1 of United States Patent No. 3,275,412, issued Sept. 27, 1966, a series of experiments was conducted to show the effect of various additives on the particle size and anatase content of the $TiO_2$ product obtained from the oxidation of $TiCl_4$. Nitrogen plasma (3.2 lbs./hour each stream) having a temperature of at least 3000° C. was used to supply heat to the $O_2$ and $TiCl_4$ streams. Results of these experiments are given in the table which follows.

Example 7

Into a burner of the type shown in U.S. Patent 3,121,641, issued Feb. 18, 1964, having both burner tubes 6″ in diameter, is fed a gas mixture containing 23.9 liters/minute of $TiCl_4$, 1.1 liters/minute of $BCl_3$ vapor, 65 liters/minute of CO, and 200 liters/minute of $O_2$ (all measured at 25° C., and 1 atmosphere pressure but preheated to 250° C.). This gas mixture is divided equally between the two tubes. The solid oxide product is found to contain 93% anatase.

Example 8

Using a burner of the same basic type and size as in Example 7, only one-half of the flow quantities shown in Example 7 are used, feeding this reactant mixture to only one of the burner tubes. A mixture of $Cl_2$-$O_2$-CO is supplied to the second burner tube and adjusted so that the momentum of the $Cl_2$-$O_2$-CO stream as it exists the burner tube is substantially equal to the momentum of the $TiCl_4$-$O_2$-CO mixture. The feed stream contained $O_2$ and CO in a molar ratio of .55 to 1, the quantity of CO being adjusted so that a stable flame is obtained. The solid $TiO_2$ collected from this operation contains 97% anatase.

Example 9

The procedure of Example 8 is followed using boron oxide instead of boron trichloride as the anatase promoter. The oxide product is found to contain substantially the same amount of anatase.

Example 10

When the procedure of Example 8 is followed using boron sulfide, it is found that the oxide product is substantially the same with respect to the anatase content.

I claim:
1. The process of preparing finely divided titanium dioxide having at least 90% by weight anatase crystalline form which comprises converting a volatile titanium salt to said dioxide in the presence of about 0.1 to 10% by weight of a boron material based on titanium dioxide, said conversion being effected in the vapor phase.
2. The process of claim 1 wherein said boron material is boron trichloride.
3. The process of claim 2 wherein said boron trichloride is admixed with silicon tetrachloride.
4. The process of claim 1 wherein said titanium salt is converted by a vapor phase oxidation reaction using a plasma stream of at least 3000° C. temperature as the preheat source.

TABLE

| Example | Additive | Wt. Percent (based on Oxide Product) | $TiCl_4$ Flow Rate (lbs./hr.) | $O_2$ Flow Rate (lbs./hr.) | Number Avg. Particle Diam.[1] ($\mu$) | Wt. Percent Anatase in Product |
|---|---|---|---|---|---|---|
| 1 | $AlCl_3$ | 3.8 | 57.7 | 17.0 | 0.165 | 1.3 |
| 2 | None | 0 | 56.7 | 17.6 | 0.170 | 43.0 |
| 3 | $SiCl_4$ | 1.4 | 56.0 | 18.5 | 0.155 | 66.0 |
| 4 | $BCl_3$ | 4.8 | 59.9 | 18.7 | 0.180 | 95.0 |
| 5 | $\{BCl_3 / SiCl_4$ | 7.2 / 1.0 | 50.1 | 18.5 | 0.167 | 91.0 |
| 6 | $BCl_3$ | 2.6 | 56.0 | 18.4 | 0.168 | 94.0 |

[1] Average particle diameter as determined on a number basis.

References Cited

UNITED STATES PATENTS

| 3,060,001 | 10/1962 | Hughes et al. | 106—300 |
| 3,068,113 | 12/1962 | Strain et al. | 23—202 XR |
| 3,105,742 | 10/1963 | Allen et al. | 23—202 |
| 3,121,641 | 2/1964 | Wikswo et al. | 23—202 XR |
| 3,275,412 | 9/1966 | Skrivan | 23—202 |

EDWARD STERN, Primary Examiner

U.S. Cl. X.R.

106—300